(12) United States Patent
Morrisey, Jr. et al.

(10) Patent No.: US 10,919,708 B2
(45) Date of Patent: Feb. 16, 2021

(54) INDEXING AND AUTO-SPACING SYSTEM

(71) Applicants: William J. Morrisey, Jr., Cedarburg, WI (US); Mark Lorenz, Port Washington, WI (US)

(72) Inventors: William J. Morrisey, Jr., Cedarburg, WI (US); Mark Lorenz, Port Washington, WI (US)

(73) Assignee: CONFLEX PACKAGING, INC., Germantown, WI (US)

(*) Notice: Subject to any disclaimer, the term of this patent is extended or adjusted under 35 U.S.C. 154(b) by 0 days.

(21) Appl. No.: 16/455,208

(22) Filed: Jun. 27, 2019

(65) Prior Publication Data

US 2020/0002101 A1 Jan. 2, 2020

Related U.S. Application Data

(60) Provisional application No. 62/692,279, filed on Jun. 29, 2018.

(51) Int. Cl.
| | |
|---|---|
| *B65G 47/28* | (2006.01) |
| *B65G 23/36* | (2006.01) |
| *B65G 19/02* | (2006.01) |
| *B65G 19/22* | (2006.01) |
| *B65G 37/00* | (2006.01) |

(52) U.S. Cl.
CPC ............ *B65G 47/28* (2013.01); *B65G 19/02* (2013.01); *B65G 19/225* (2013.01); *B65G 23/36* (2013.01); *B65G 37/005* (2013.01)

(58) Field of Classification Search
CPC ........ B65G 47/28; B65G 23/36; B65G 19/02; B65G 19/205; B65G 19/225; B65G 19/265; B65G 37/005; B65G 43/10

USPC ......................................................... 198/726
See application file for complete search history.

(56) References Cited

U.S. PATENT DOCUMENTS

| | | | | | |
|---|---|---|---|---|---|
| 3,194,382 | A | * | 7/1965 | Nigrelli | B65G 47/088 198/418.1 |
| 3,620,353 | A | * | 11/1971 | Milton | B64D 9/00 198/809 |
| 4,571,236 | A | * | 2/1986 | Adams | B31B 50/00 198/470.1 |
| 4,768,642 | A | * | 9/1988 | Hunter | B65G 47/082 198/419.2 |
| 4,928,810 | A | * | 5/1990 | Hultberg | B65G 15/10 198/699.1 |
| 5,501,318 | A | * | 3/1996 | Disrud | B65G 47/841 198/732 |
| 10,272,585 | B1 | * | 4/2019 | Chike | B65G 19/225 |
| 2009/0313955 | A1 | * | 12/2009 | Gudim | B65B 5/068 53/534 |
| 2014/0014477 | A1 | * | 1/2014 | Vine | B65G 19/265 198/698 |
| 2014/0360845 | A1 | * | 12/2014 | Bergler | B65G 47/28 198/817 |

(Continued)

*Primary Examiner* — Mark A Deuble
(74) *Attorney, Agent, or Firm* — Joseph S. Heino; Erin E. Kaprelian

(57) ABSTRACT

A system comprises a track surface and includes a plurality of motors. The system may further include a plurality of chains. Each chain may be coupled to a motor and may be disposed along a length of the track surface. A plurality of pushers may further be included, with each pusher coupled to a chain of the plurality of chains. In some examples, a controller may be coupled to the plurality of motors.

3 Claims, 3 Drawing Sheets

(56) References Cited

U.S. PATENT DOCUMENTS

2016/0347549 A1\* 12/2016 Beesley ................ B65G 23/26

\* cited by examiner

INDEXING AND AUTO-SPACING SYSTEM

PRIORITY

This application claims priority to U.S. Provisional Patent Application No. 62/692,279, filed Jun. 29, 2018, the contents of which are hereby incorporated by reference.

BACKGROUND OF THE INVENTION

Within production environments, product flow, spacing, and speed are factors that influence the efficiency and success of a production line. When product flow is inconsistent, spacing is uneven, and/or speed varies, the efficiency of the production line may be affected. As a result, the success of the production line may decrease due to decreased efficiency and additional intervention by workers to correct the product flow, spacing, and speed.

DETAILED DESCRIPTION

Figure 1:
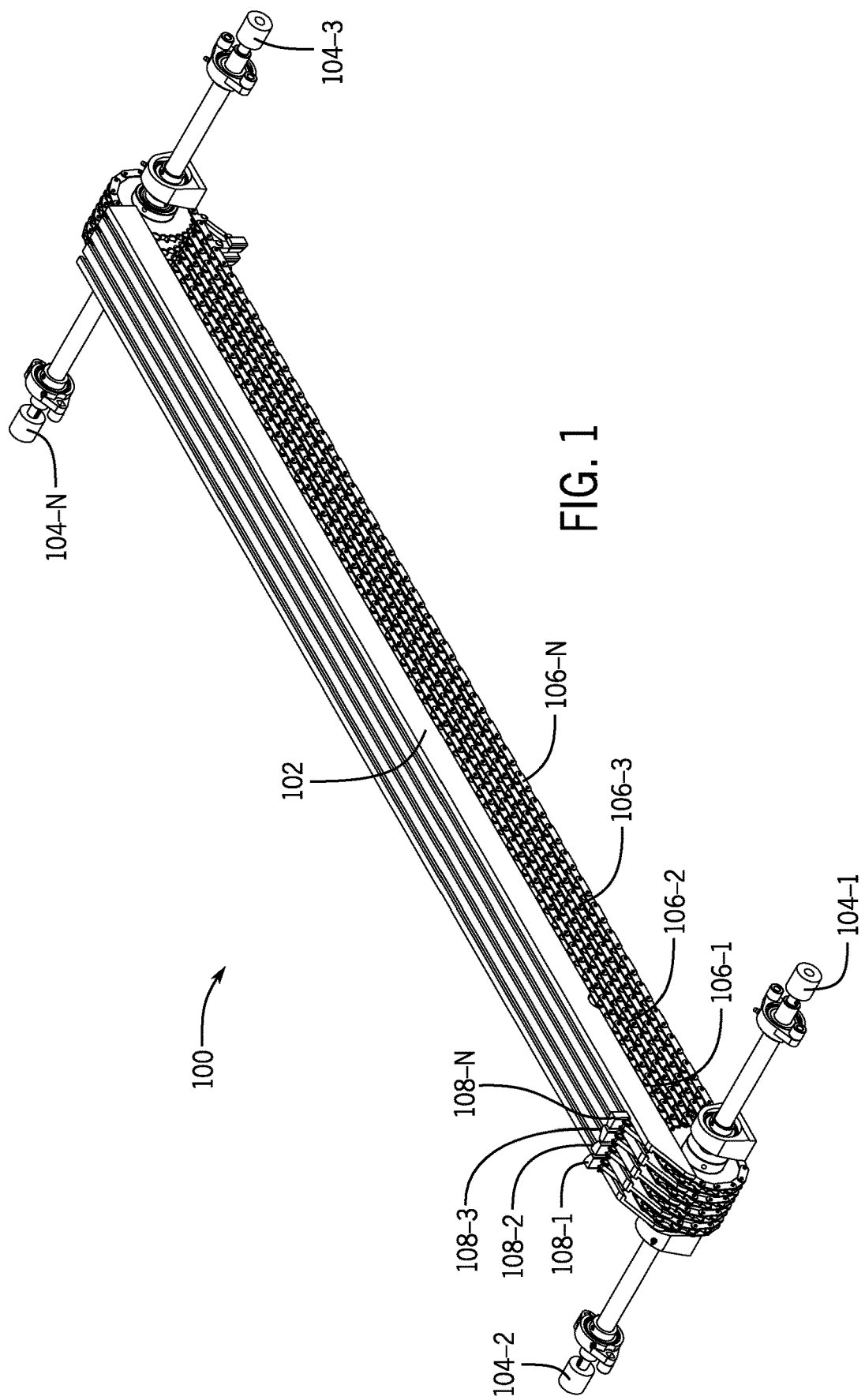
FIG. 1 is an example system consistent with the present disclosure.

Production environments, such as factories, assembly lines, and the like, may utilize systems including conveyors and belts to transport a product through a production line. As part of the production lines, the product may be expected to stop at a particular station for inspection or go through a particular station at a particular speed to allow for examination of the product. In order for the production line to not be interrupted, the product may need to flow down the line with consistency; that is, with regular spacing, speed, and timing. Should, for example, the spacing become inconsistent, product may back up at one spot on the line. Similarly, inconsistent spacing and speed, and thus inconsistent flow, may impact the amount of product able to be handled by the production line over a particular period of time. This in turn may affect production rates, as time may be diverted from production in order to address issues with spacing and speed, instead of keeping production going. These delays may end up costing the company overseeing the production environment both time and money.

One way to combat inconsistent spacing is to position products so they are back to back. In some instances, a trailing end of one product may actually be in contact with a leading edge of a product right behind it; in other examples, the products may not be in contact but may have an extremely small amount of space between them. However, when products are in contact with one another on a production line, the products may skew out of position. Even slight skew may result in incorrect product movement, as production lines are often sized to accommodate the products being carried; thus, a product that is slightly off-center may not fit as well within the production line. Additionally, production lines often use sensors or other detection means to track product movement. Skewed product may not interact with the detection means correctly. Said differently, product that is skewed may be detected too early or too late, depending on the direction of skew.

Another way to space products on a production line involves the use of two independently driven belts on a single carriage. The two belts may run at different speeds and traverse back and forth along the product surface plane, allowing the products to be spaced. Use of such a dual-belt system may allow products to be evenly and accurately spaced when the production line is running at relatively slow speeds. However, the accuracy of the spacing achievable by this system may decrease as product and/or line speed increases.

By contrast, the system of the present disclosure involves multiple sections that are all independently driven. This may allow multiple velocities to be running simultaneously for different products, such that each section is able to be run at an appropriate speed that will not affect either upstream or downstream sections of the product line. Moreover, the present system may include multiple flight lugs and pushes along the same plane. As a result, products may be independently driven, with independent speed and spacing, such that spacing may be achieved accurately throughout the entire length of the section.

In addition, the system of the present disclosure may include the ability to join sections, thus creating a combined system. For example, one section may be used to insert product onto a second section. This may allow multiple products to be combined and collated within a single section. Additionally, a combined system may allow for accurate spacing even when operating at high line and production speeds.

The system of the present invention may comprise a track surface. A plurality of chains may be disposed along the track surface, and be coupled to a plurality of motors. Each motor may be independently operable, such that each chain can be driven at a different speed. The chains may further be coupled to a plurality of sprockets, which may in turn be coupled to a drive shaft. Each chain and motor combination may have an individual drive shaft to allow for independent operation.

FIG. 1 is an example system 100 consistent with the present disclosure. System 100 may include a track surface 102. In some examples, such as the example shown in FIG. 1, the track surface may be a substantially horizontal and planar surface having a length disposed between two end portions. In other examples, the track surface may be substantially vertical or disposed on an incline, with the incline being an ascending incline or a descending incline. In still other examples, the track surface may be curved. In such examples, the track may comprise a partial curve, such as a half-circle, a full curve, such as a full circle, or a series of curves, such as a spiral. Examples are not so limited, however, and any shape of track surface may be used.

The track surface may be made of a metal, such as steel, stainless steel, or aluminum, or made of plastic or another suitable material. The track surface may include a plurality of lanes. As used herein, a "lane" refers to a portion of the track surface running along the length of the track surface but having a width less than the width of the track surface. The lanes are discussed further herein with respect to FIG. 2.

System 100 may further include a plurality of motors 104-1, 104-2, 104-3 . . . 104-N (collectively, motors 104). As used herein, a "motor" refers to a mechanized driver. Although four motors 104 are shown in FIG. 1, examples are not so limited, and any number of motors may be used. Motors 104 may be servo motors, linear motors, alternating current (AC) motors, direct current (DC) motors, or any other type of suitable driver Each motor of the plurality of motors 104 may be disposed at an end of the track surface 102. In some examples, the number of motors 104 may correspond to the number of lanes on the track surface 102. The plurality of motors 104 may be coupled to a controller, discussed further herein with respect to FIG. 2. In some examples, the controller may control the plurality of motors and may include a processor to execute instructions to control the plurality of motors. This functionality is discussed further herein with respect to FIGS. 2 and 3.

A plurality of chains 106-1, 106-2, 106-3 . . . 106-N (collectively, chains 106) may be included within system 100. As used herein, a "chain" refers to an object that is used to pull or support loads. In some examples, chains 106 may be metal chains, formed of interconnecting links. In other examples, chains 106 may be a belt. In such examples, the belt may be formed of fabric, such as nylon, plastic, or any other suitably flexible yet strong material. Examples are not so limited, however, and any material, in any configuration, may be used to form chains 106, provided that the material is able to support a load on the track surface 102.

Each chain of the plurality of chains 106 may be coupled to a motor of the plurality of motors 104. As a result, each chain of the plurality of chains 106 may be driven by a separate motor of the plurality of motors 104. The plurality of chains 106 may be disposed lengthwise along the track surface 102. Said differently, the plurality of chains 106 may run along the length of the track surface 102. In some examples, each chain of the plurality of chains 106 may be disposed within a lane of the track surface 102.

System 100 may further include a plurality of pushers 108-1, 108-2, 108-3 . . . 108-N (collectively, pushers 108). As used herein, a "pusher" refers to a protrusion or protuberance used to assist in moving an object along a path. Although four pushers 108 are shown in FIG. 1, examples are not so limited, and any number of pushers 108 may be used. Each pusher of the plurality of pushers 108 may be coupled to a chain of the plurality of chains 106, and may further extend upward such that the pushers 108 are substantially perpendicular to the chains 106. However, examples are not so limited, and other configurations of pusher 108 with respect to chains 106 may be used.

When an object is dropped onto the track surface 102, pushers 108 may contact the object and aid the object in moving along the track surface 102. A single pusher of pushers 108 may be used, or multiple pushers may contact a single object. In some examples, the position of the pusher 108 may serve to direct the object. For example, an object may be introduced onto the system 100 at an angle to the track surface 102. Upon contact with a pusher 108, the object may begin moving along the track surface 102 in the direction thereof. Pushers 108 may be manufactured from a metal, such as steel or aluminum, plastic, or any other suitable material.

Figure 2:
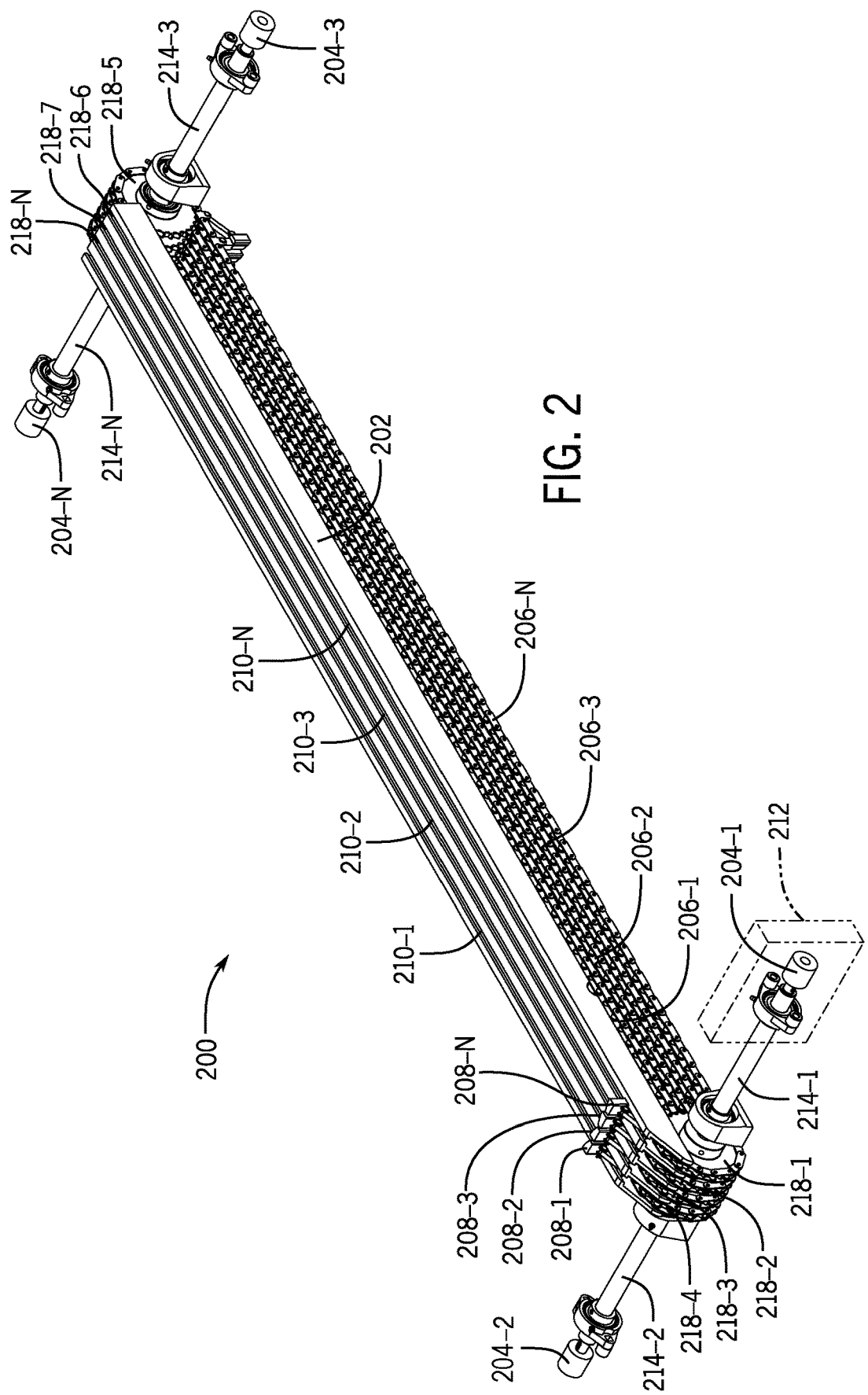
FIG. 2 is another example system consistent with the present disclosure.

FIG. 2 is another example system 200 consistent with the present disclosure. System 200 may include a track surface 202. Track surface 202 may be akin to track surface 102, discussed previously with respect to FIG. 1. Track surface 202 may include a plurality of lanes 210-1, 210-2, 210-3 . . . 210-N (collectively, lanes 210). As described with respect to FIG. 1, a "lane" refers to a subset portion of the overall track surface 202, with adjacent lanes being divided from one another by, for example, grooves or shallow walls. Although FIG. 2 shows four lanes 210, examples are not so limited, and any number of lanes may be used. Lanes 210 may run substantially parallel to one another along the length of the track surface 202, although examples are not so limited.

System 200 may further include a plurality of motors 204-1, 204-2, 204-3 . . . 204-N (collectively, motors 204). Motors 204 may be akin to motors 104, described with respect to FIG. 1. As described previously, motors 204 may be disposed at an end of the track surface 202; however, examples are not so limited and the motors 204 may be disposed at any location with respect to the track surface 202.

Motors 204 may be coupled to a controller 212. As used herein, a "controller" refers to a device that interfaces with a peripheral device. The controller may be a chip, an expansion card, or a stand-alone device, and may serve to manage a connection or link between two devices. Although FIG. 2 shows controller 212 directly coupled to a motor 204, examples are not so limited, and controller 212 may be disposed anywhere within system 200 and may interface with motors 204 directly (e.g., by being coupled, either physically or mechanically, to at least one motor) or wirelessly. In some examples, controller 212 may be configured to function in a particular mode, where the particular mode corresponds to a particular application or use of system 200.

Within system 200, the controller 212 may serve to manage motors 204. For example, the controller 210 may regulate the speed and/or the operation of a motor 204. In some examples, a single controller 212 may interface with each motor of the plurality of motors 204, such that each motor 204 is able to be independently controlled without having individual or dedicated controllers for each motor 204. In other examples, a single controller 212 may control a subset of the plurality of motors 204. For instance, a controller 212 may interface with a pair of motors 204 that are set up to run on the same parameters. Examples are not so limited, however, and the controller 212 may interface with any number of motors of the plurality of motors 204.

System 200 may further include a plurality of chains 206-1, 206-2, 206-3 . . . 206-N (collectively, chains 206). Chains 206 may be akin to chains 106, described previously with respect to FIG. 1. As described with respect to FIG. 1, chains 206 may be disposed along a length of track surface 202. In some examples, each chain of the plurality of chains 206 may be disposed within a lane of the plurality of lanes 210 of the track surface 202. Each chain 206 may be coupled to a motor of the plurality of motors 204, such that the motor 204 may move or drive the chain 206 with respect to the track surface 202.

System 200 may further include a plurality of drive shafts 214-1, 214-2, 214-3 . . . 214-N (collectively, drive shafts 214). As used herein, a "drive shaft" refers to a rotating shaft that transmits torque and rotation to the element or elements to which it is coupled. Although four drive shafts 214 are shown in FIG. 2, examples are not so limited, and any number of drive shafts 214 may be used. In some examples, the number of drive shafts 214 may correspond to the number of lanes 210 of the track surface 202. In such examples, each lane 210 may have its own drive shaft 214.

Each drive shaft of the plurality of drive shafts 214 may be mechanically coupled to a motor of the plurality of motors 204 such that when the motor 204 is in operation, the corresponding drive shaft 214 may be rotated. The rate at which the drive shaft 214 rotates may correlate to the speed of the motor 204 associated with the drive shaft 214; increasing the speed of the motor 204 may increase the rate of rotation of the drive shaft 214, while decreasing the speed of the motor 204 may decrease the rate of rotation of the drive shaft 214. In some examples, the number of motors 204 may correspond to the number of drive shafts 214, such that each drive shaft 214 may be driven by an individual motor 204.

In some examples, drive shafts 214 may be separated at an end of the track surface 202 at a gap. That is, a first drive shaft, such as drive shaft 214-1, may be disposed at a first side of the end of the track surface 202 and second, separate drive shaft, such as drive shaft 214-2, may be disposed opposite the first drive shaft 214-1, such that the two drive shafts 214 are separated by a gap. A similar setup may be present at a second end of the track surface 202. By being slightly separated, each drive shaft 214 may be driven independently by a corresponding motor 204. Said differently, drive shaft 214-1 may be driven by motor 204-1, while drive shaft 214-2 may be driven at a different rate by motor 204-2, and so on. This may allow for greater variability and control of the system 200.

A plurality of sprockets 218-1, 218-2, 218-3, 218-4, 218-5, 218-6, 218-7 . . . 218-N (collectively, sprockets 218) may be coupled to each drive shaft of the plurality of drive shafts 214. As used herein, a "sprocket" refers to a wheel with teeth or cogs that are able to mesh with a chain, track, or other material passing over the sprocket. The teeth may extend radially outward from the wheel such that a chain is able to mesh or interact with the teeth, although examples are not so limited. The plurality of chains 206 may be coupled to the plurality of sprockets 218. In some examples, each chain of the plurality of chains 206 may be coupled to a single sprocket 218 on a drive shaft 214.

System 200 may include multiple types of sprockets 218. One type of sprocket 218 may be a drive sprocket. As used herein, a "drive sprocket" refers to a sprocket that is engaged with a moving chain, such as chain 206. Said differently, a drive sprocket refers to a sprocket that is in use when system 200 is being used. Another type of sprocket 218 may be an idler sprocket. As used herein, an "idler sprocket" refers to a sprocket that is engaged with a chain that is not being used but is sitting abreast of the chain that is in use, or engaged with the drive sprocket. The idler sprocket may be disposed adjacent to the drive sprocket and may be on the same drive shaft, such as drive shaft 214; however, the chain 206 coupled to the drive sprocket may be the chain 206—and lane 210—onto which product is dropping, while the idler sprocket may serve as a backup to the drive sprocket.

System 200 may further include a plurality of pushers 208-1, 208-2, 208-3 . . . 208-N (collectively, pushers 208). Pushers 208 may be akin to pushers 108, described with respect to FIG. 1. As discussed with respect to FIG. 1, a "pusher" refers to a protrusion or protuberance used to assist in moving an object along a path. Each pusher of the plurality of pushers 208 may be coupled to a chain of the plurality of chains 206. In some examples, each chain 206 may include multiple pushers 208 spaced at regular intervals. In such examples, the pushers 208 may be spaced with a desired spacing such that products on the track surface 202 have a predetermined and consistent distance between them. In some examples, the pushers 208 may be movable with respect to the chain 206. Said differently, a pusher 208 may be able to be moved to a different portion of the chain 206 to accommodate a variety of spacing and/or production needs.

System 200 may further include a plurality of sensors. As used herein, a "sensor" refers to a device that detects and responds to an input from the physical environment. The input may be, for example, heat, light, sound, or a particular motion, and the response may occur upon receipt of the input at the sensor. With respect to system 200, a plurality of sensors may be disposed above the track surface 202. The sensors may be, for example, optical sensors or laser sensors, although examples are not so limited. In some examples, the plurality of sensors may be disposed at two locations along the track surface 202. For example, a first sensor may be disposed at a first location above the track surface 202 and a second sensor may be disposed at a second location above the track surface 202.

The sensors may be coupled to the controller 212 such that the controller 212 receives the response from the input detected by the sensor. For example, in the case of an optical sensor, the sensor may detect that an edge of a product traveling along the track surface has passed under the sensor at a particular time. The sensor may then transmit to the controller 212 a notice that the product edge has passed the location. In some examples, a pair of sensors may operate together to determine an amount of time that elapses between a product passing the first sensor and the product passing the second sensor. The amount of time may be a known quantity based on the speed at which a chain 206 is moving; that is, based on the rate of rotation of the drive shaft 214 and thus the movement of the chain 206, a product might be known to take a particular amount of time to move between a first sensor and a second sensor. Upon detection of the product by the second sensor, a notice of the elapsed time may be transmitted to the controller 212. The controller may then determine whether the elapsed time matches the expected time. If it does not, i.e., if the product is moving too quickly or too slowly, the controller 212 may adjust the rate of rotation of the drive shaft 214, and thus the rate at which the chain 206 is moving. This may aid in ensuring that the product continues to move along the track surface 202 at a consistent pace and with consistent spacing. That is, the controller may be coupled to a sensor such that position feedback is given, allowing for precise control of position, velocity, and acceleration of products moved by system 200. The use of the sensors is discussed further herein with respect to FIG. 3.

Figure 3:
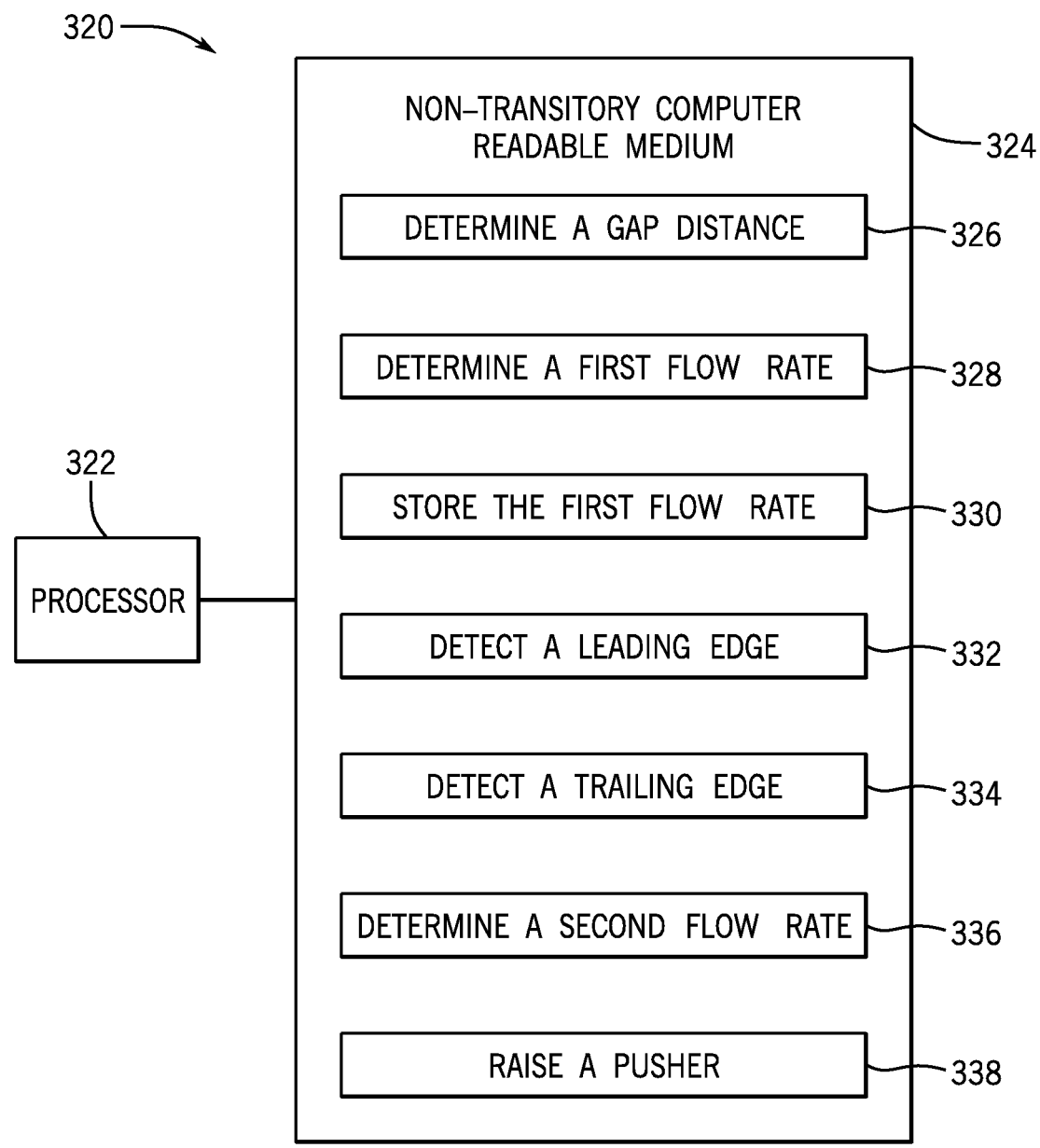
FIG. 3 is another example system consistent with the present disclosure.

FIG. 3 is a schematic diagram an example system 320 consistent with the present disclosure. System 320 may include a processor 322. Processor 322 may be one or more central processing units (CPUs), microprocessors, and/or other hardware devices suitable for retrieving and executing instructions stored on a storage medium. As an alternative, processor 322 may include one or more electronic circuits containing a number of electronic components for performing functionality of the stored instructions.

Processor 322 may be coupled to a non-transitory computer readable medium 324. As used herein, a "non-transitory computer readable medium" may be any electronic, magnetic, optical, or other physical storage device that stores executable instructions. Thus, non-transitory computer readable medium 322 may be, for example, random access memory (RAM), an Electronically-Erasable Programmable Read-Only Memory (EEPROM), a storage drive, an optical disc, and the like. Non-transitory computer readable medium 324 may further be a portable, external, or remote storage medium that allows a processor, such as processor 322, to download instructions from said storage device. Non-transitory computer readable medium 324 may have a plurality of instructions, such as instructions 326, 328, 330, 332, 334, 336, and/or 338 stored thereon, such that the instructions are accessible by processor 322 for execution.

Instructions 326 may include instructions executable by a processor, such as processor 322, to determine a gap distance. As used herein, a "gap distance" refers to an amount of space between two items. In the present case, the gap distance may correspond to an amount of space between a first product and a second product, although examples are not so limited. The gap distance may be determined using a first sensor. As described with respect to FIG. 2, the first sensor may be a device that detects and responds to an input, such as a particular motion, from the physical environment. The first sensor may be an optical sensor or a laser sensor, although examples are not so limited and the first sensor may be any other suitable type of sensor.

The first sensor may be disposed at a first location above a track surface. In some examples, the first sensor may be disposed at an upstream location along the track surface, such that a gap distance is detected early within the system. For example, the first sensor may be disposed at a location along the track surface that is before the location where the chains and pushers coupled thereto are located, such that a gap distance is determined by instructions 326 prior to a pusher being used to assist in product transport.

Instructions 328 may include instructions executable by a processor, such as processor 322 to determine a first flow rate. As used herein, a "flow rate" refers to a pace at which items are moving along a defined area. In the present example, the first flow rate may correspond to the rate at which a first product and a second product, as well as subsequent products, are moving within the system and/or along the track surface. The first flow rate may be determined based on the gap distance determined at instructions 326. For instance, at instructions 326, a gap distance between a first product and a second product may be determined using a first sensor. In addition to determining the gap distance, the first sensor may also determine an elapsed time. The elapsed time may correspond to the amount of time between detection of the first product and detection of the second product, although examples are not so limited. Using the determined gap distance and the elapsed time, a first flow rate may be determined by instructions 328.

Instructions 330 may include instructions executable by a processor, such as processor 322, to store the first flow rate at a controller. The controller may be akin to controller 212, discussed with respect to FIG. 2. The controller may be coupled to processor 322, such that processor 322 is able to transmit the first flow rate to the controller. This coupling may be wired or wireless, and the flow rate may be transmitted to the controller via a wired signal or via a wireless signal. In some examples, the flow rate may be stored in a memory of the controller.

Instructions 332 may include instructions executable by a processor, such as processor 322, to detect a leading edge of the first product. As used herein, a "leading edge" refers to a front or initial edge of a product, as the product travels along a track. The leading edge may be detected by a second sensor. As described with respect to FIG. 2, the second sensor may be a device that detects and responds to an input, such as a particular motion, from the physical environment. The second sensor may be an optical sensor or a laser sensor, although examples are not so limited and the second sensor may be any other suitable type of sensor.

The second sensor may be located above a track surface, and may be located at a location different than the location of the first sensor. In some examples, the second sensor may be located downstream from the first sensor. Said differently, the second sensor may be located after the first sensor, such that the first product would pass by the first sensor prior to having a leading edge detected by the second sensor at instructions 332.

Instructions 334, when executed by a processor such as processor 322, may include instructions executable to detect a trailing edge of the first product. As used herein, a "trailing edge" refers to a rear edge of a product, from the reference point of a product traveling along a track. As with the leading edge, the trailing edge may be detected by the second sensor.

Instructions 336 may include instructions executable by a processor, such as processor 322, to determine a second flow rate. As described previously, the "flow rate" refers to a pace at which items are moving along a defined area. The second flow rate correspond to a rate at which the first product is moving along a track surface. In such examples, the second flow rate may be determined based on an amount of time between detection of the leading edge of the first product, detected by instructions 332, and detection of the trailing edge of the first product, detected by instructions 334. This time difference may be used to determine the second flow rate. In some examples, the second flow rate may be determined by dividing a known dimension of the first product, such as the length or diameter, by the time difference. In such examples, the known length may correspond to the length between the leading edge and the trailing edge of the product.

Instructions 338, when executed by a processor such as processor 322, may include instructions executable to raise a pusher. The pusher may be located on a chain on a track surface, as described with respect to FIGS. 1 and 2. The pusher may be raised at a location on the chain along the track surface that corresponds to a determined location of the first product. That is, the pusher may be raised at a location at which the first product is determined to be at a particular time, allowing the pusher to contact the first product as the first product continues along the track surface.

The determined location of the first product, and thus the location at which the pusher may be raised, may be determined based on a comparison of the first flow rate, stored by instructions 330 at a controller, and the second flow rate, determined by instructions 336. In some examples, a comparison of the first flow rate and the second flow rate may show that the second flow rate is different than the first flow rate. Said differently, the second flow rate may be determined to be different than the first, stored flow rate, indicating that the first product is moving at a different speed at the second sensor than it was at the first sensor. This may be due to a number of factors, including a product backup on the track surface, a larger or smaller than average gap in products, or a change in the rate at which the chains on track surface are driven.

Based on a determination that the second flow rate is different than the first flow rate, a future location of the first product may be determined. The future location may be determined based on the second product flow rate alone, rather than on the first flow rate or a combination of the first and second flow rates, and may correspond to a location that the first product will be at along the track surface at a particular time in the future. For example, the first product may be determined to be moving at a second flow rate of one foot per second, which may be different than the first flow rate of one-half foot per second. Based on this difference, processor 322 may execute instructions to determine that, after one second, the first product will have moved one foot. This future location may be determined based on a known location, such as the location of the second sensor. However, examples are not so limited, and other first and second flow rates, as well as other known locations, may be used.

System 320 may further include instructions executable by processor 322 to synchronize a location of the pusher. The synchronized pusher location may correspond to the determined future location of the first product. Said differently, the pusher location may be altered such that the pusher raises at a location that the first product will pass at a future time. The pusher may then raise at this synchronized location, allowing the pusher to contact the first product and facilitate continued movement of the first product along the track surface.

In some examples, the pusher may be synchronized by altering a drive rate of the chain to which the pusher is coupled. System 320 may include instructions executable by processor 322 to determine that the chain is being driven at a particular rate. As discussed previously, the chain may be driven by a motor, which may in turn be controlled by the controller. Based on the determined particular rate, a determination that the pusher will be at a particular location at a particular time may be made. Said differently, by knowing the rate at which the chain is being driven, system 320 may determine where the pusher will be at a particular time.

In some examples, the determined particular location of the pusher may not correspond to the synchronized location of the pusher. This may occur when, for example, the second flow rate of the product, determined at 336, is different than the first flow rate of the product, determined at 328. In such examples, system 320 may include instructions executable by processor 322 to change a drive rate of the chain. The drive rate of the chain may be changed by, for example, using the controller to increase or decrease the rate at which the motor is driven, thus altering the rate of rotation of the drive shaft. Because the chain is coupled to the drive shaft at a plurality of sprockets, changing the rate of rotation of the drive shaft thus adjusts the drive rate of the chain.

The drive rate of the chain may be changed such that the pusher coupled thereto will reach its synchronized location at the determined time. As previously discussed, the synchronized location may correspond to a determined future location of the first product. Thus, by altering the drive rate of the chain to coordinate with the synchronized location, the pusher may raise when the first product is at the determined future location. For example, the first product may be determined to be at a particular location, X, at a time, T, based on the second flow rate. The initial drive rate of the chain, however, may be based on the first flow rate, such that the pusher would be at a location Y at the time T. Thus, to synchronize the pusher to be at location X at time T, the drive rate of the chain may be altered, through either an increase or decrease thereof, so that the pusher will be at location X at time T, ready to meet the first product. Examples are not so limited, however, and other locations, times, and/or changes to the drive rate may be made.

In some examples, the future location of the first product may correspond to an indexed location. As used herein, an "indexed location" refers to a location that coincides with a second system or target. For example, the first product may move along a track surface, such as track surface 102 or track surface 202, but may move onto a second track surface that is part of a second system. As described with respect to FIGS. 1 and 2, pushers 108/208 may be coupled to chains 106/206, respectively, and may be spaced at regular intervals, such that there is a known distance between each pusher. The future location of the first product, therefore, may correspond to the known distance between a pair of pushers, such that the first product is indexed or targeted within that particular space. As a result, the first product may move along the track surface 102/202, and may join with a second system for further processing.

In the foregoing detailed description of the present disclosure, reference is made to the accompanying drawings that form a part hereof, and in which are shown by way of illustration how examples of the disclosure may be practiced. These examples are described in sufficient detail to enable those of ordinary skill in the art to practice the examples of this disclosure, and it is to be understood that other examples may be utilized and that process and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and relative scale of the elements provided in the figures are intended to illustrate the examples of the present disclosure and should not be taken in a limiting sense.

The invention claimed is:

1. A non-transitory computer readable medium containing instructions executable by a processor to:
   determine, at a first sensor, a gap distance between a first product and a second product;
   determine a first flow rate, wherein the first flow rate is determined based on the gap distance between the first product and the second product;
   store the first flow rate at a controller;
   detect, at a second sensor, a leading edge of the first product;
   detect, at the second sensor, a trailing edge of the first product;
   determine a second flow rate, wherein the second flow rate is based on a time difference between detection of the leading edge of the first product and detection of the trailing edge of the first product; and
   raise a pusher located on a chain on a track surface, wherein:
      the pusher is raised at a location corresponding to a determined location of the first product; and
      the determined location is based on a comparison of the stored first flow rate and the second flow rate of the first product.

2. The non-transitory computer readable medium of claim 1, further comprising instructions executable by a processor to:
   determine that the second flow rate differs from the first flow rate;
   determine a future location of the first product based on the second flow rate;
   synchronize a location of the pusher based on the determination that the second flow rate is different than the first flow rate, wherein the synchronized pusher location corresponds to the determined future location of the first product.

3. The non-transitory computer readable medium of claim 2, wherein the instructions to synchronize a location of the pusher further comprise instructions executable by a processor to:
   determine that the chain is being driven at a particular rate;

determine that the pusher will be located at a particular location at a particular time, wherein the particular location is based on the particular rate; and change a drive rate of the chain, wherein:
the drive rate of the chain is changed based on the 5 second flow rate; and
the changed drive rate of the chain corresponds to the synchronized location of the pusher.

\* \* \* \* \*